United States Patent [19]

Kempen

[11] Patent Number: 5,575,186
[45] Date of Patent: Nov. 19, 1996

[54] MACHINE TOOL STROKE CONTROL SYSTEM

[75] Inventor: Kirk A. Kempen, Kankakee, Ill.

[73] Assignee: Peddinghaus Corporation, Bradley, Ill.

[21] Appl. No.: 132,716

[22] Filed: Oct. 6, 1993

[51] Int. Cl.$^6$ ........................................ B26D 5/02
[52] U.S. Cl. ........................ 83/13; 83/248; 83/525; 83/530; 83/599; 72/21.3; 72/441; 100/48; 100/257
[58] Field of Search ................. 83/13, 240, 248, 83/525, 527, 530, 536, 599, 605; 72/21, 26, 35, 441; 100/48, 99, 257, 20.1, 21.3

[56] References Cited

U.S. PATENT DOCUMENTS

| | | | |
|---|---|---|---|
| 3,028,531 | 4/1962 | Heiberger et al. | 83/527 X |
| 3,566,638 | 3/1971 | Herbst | 72/21 X |
| 3,866,522 | 2/1975 | Oswalt, Jr. | 83/599 X |
| 3,874,205 | 4/1975 | Roch et al. | 72/441 X |
| 4,091,698 | 5/1978 | Obear et al. | 83/530 X |
| 4,098,105 | 7/1978 | Fullers et al. | 72/21 |
| 4,378,717 | 4/1983 | Schneider et al. | 83/527 X |
| 4,479,410 | 10/1984 | Taguchi | 83/530 X |
| 4,510,570 | 4/1985 | Yonekura | 72/21 X |
| 4,534,249 | 8/1985 | Smith | 83/525 X |
| 4,538,493 | 9/1985 | Perazzolo et al. | 83/530 |
| 5,345,861 | 9/1994 | Brewer et al. | 83/527 X |

FOREIGN PATENT DOCUMENTS 728906  3/1966  Canada ................................ 72/441

OTHER PUBLICATIONS

Lucas Control Systems Products Catalog entitled "Ledex Incremental and Absolute Rotary Encoders", Catalog LL-9111 Nov. 1992.

Primary Examiner—Rinaldi I. Rada
Assistant Examiner—Clark F. Dexter
Attorney, Agent, or Firm—Dressler, Goldsmith, Shore & Milnamow, Ltd.

[57] ABSTRACT

A unique system and process for controlling the stroke positions of tools on a multi-station metal working machine are disclosed. The system and process are suitable for use with a metal working machine which carries the tools on an arm pivoted by an actuator. In the preferred embodiment, the control system includes a control circuit which continuously senses the position of the arm by use of a pulse generator rotary encoder. The control system stores settable initial and final stroke positions for each of the tools. The actuator is controlled to move the arm and the tools carried thereon.

2 Claims, 3 Drawing Sheets

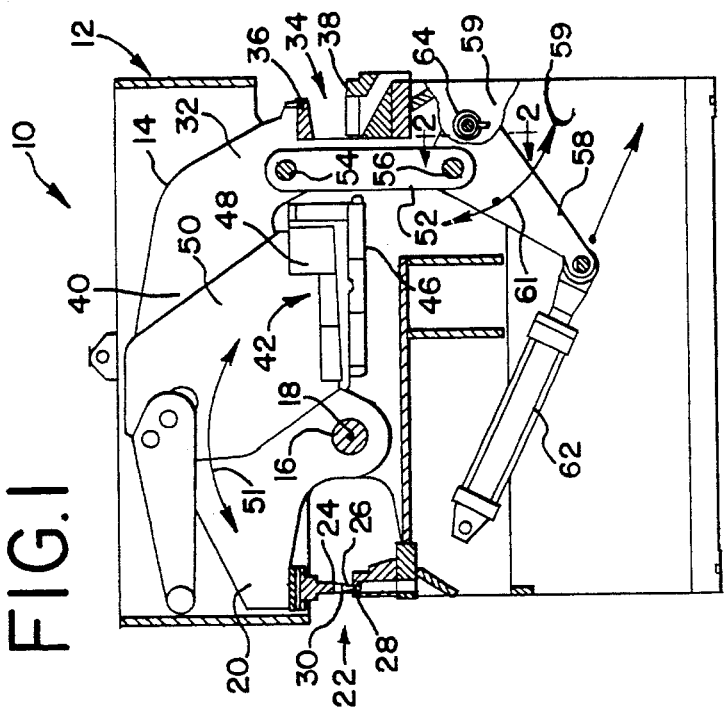
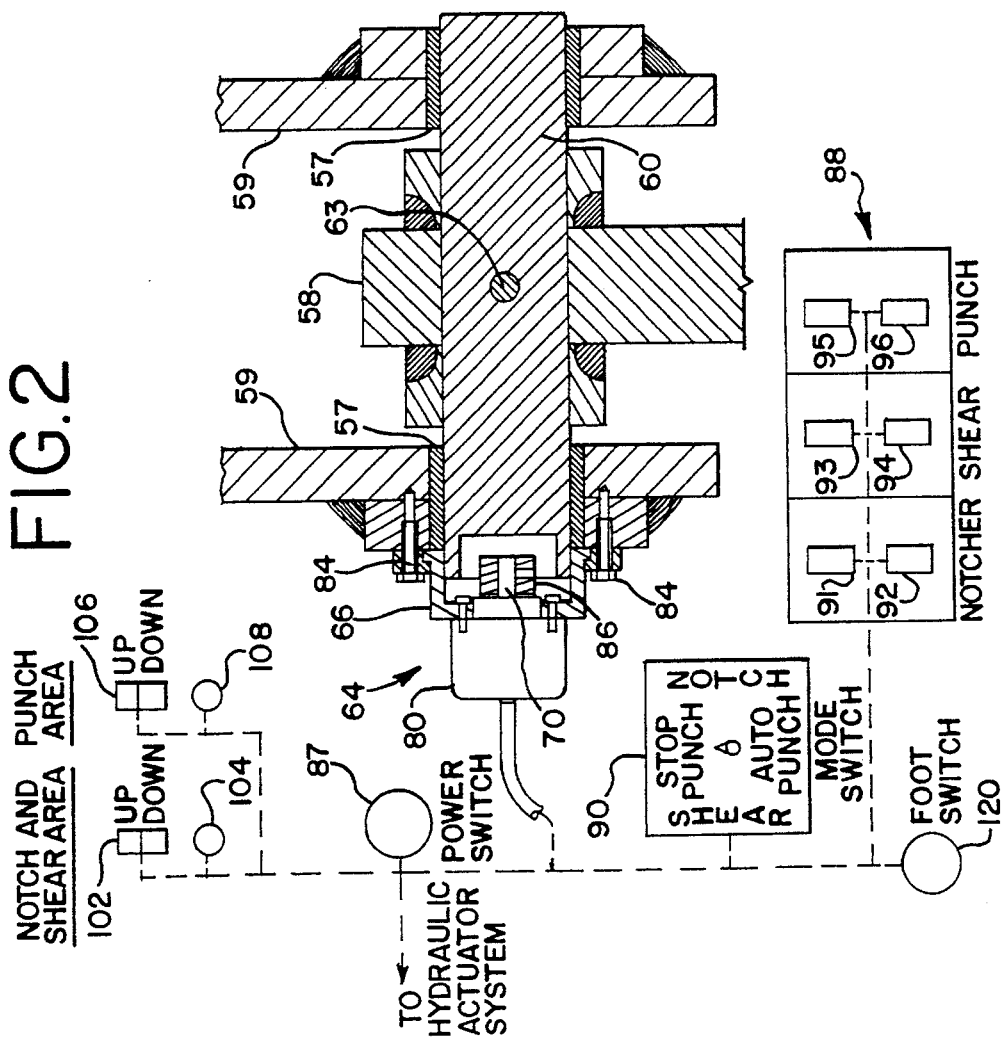

5,575,186

MACHINE TOOL STROKE CONTROL SYSTEM

TECHNICAL FIELD

This invention relates to a system and process for controlling the stroke positions of tools on a multi-station metal working machine.

BACKGROUND OF THE INVENTION AND TECHNICAL PROBLEMS POSED BY THE PRIOR ART

Machine shops, structural steel plants, manufacturing facilities, and the like may employ machines for shearing metal workpieces, such as steel stock of various shapes and sizes. One type of machine, commonly known as an "ironworker" or "universal steelworker", performs various different metal working processes on workpieces at various separate stations. Typically there is a punching station for punching holes or other shapes, a notching station for notching the edge of a workpiece, and a bar stock shearing station for shearing lengths of round or square bars or flat stock.

An example of such an ironworker design is described in the U.S. Pat. No. 3,866,522. The ironworker machine employs a single, large arm or beam which is pivotally mounted to a frame and which is operated with a hydraulic piston and cylinder actuator. The various stations, such as a punching station, a shearing station, and a notching station, are defined at various locations along the length of the pivotally mounted beam. At each station, a particular tool is mounted on the beam for movement with the beam relative to a die or other, cooperating, fixed tool on the frame. Such an ironworker design provides the advantages of simple operation and low cost.

In a typical arrangement of the conventional pivoting beam ironworker machine, the height to which the cutting or punching tool rises above the workpiece, the top of stroke position, must be set according to the thickness of the workpiece. To facilitate meeting safety standards, as well as workplace efficiency requirements, manual push buttons, selector switches, foot switches and limit switches are provided to control the operation of the various tools.

Typically, one pair of limit switches is provided for each tool. The limit switches are positioned to correspond to the top and bottom of stroke positions and are used, through relay control logic circuits, to stop and reverse tool movement, respectively. However, each time the thickness of the workpieces change, the limit switches must be reset to account for the reduced or increased stroke required. Accordingly, it would be desirable to provide an improved system and process for controlling the stroke positions of the various tools on a multi-station metal working machine without the use of limit switches. This would permit efficient setting of the top and bottom stroke positions without the necessity to reset limit switches often.

The present invention provides an improved system and process for sensing and controlling the stroke positions of various tools on a multi-station metal working machine. The improved system and process accommodate continuous sensing of stroke position and provide for readily resettable top and bottom stroke positions without the necessity to reset limit switches.

SUMMARY OF THE INVENTION

An apparatus in accordance with the teaching of the present invention provides a novel system and process for controlling the stroke positions of tools on a multi-station metal working machine. The tools are carried on an arm of the machine which is operatively connected to an actuator for moving the arm between selectable initial stroke positions (e.g., top of stroke) and final stroke positions (e.g., bottom of stroke) for each of the tools relative to a workpiece.

The system includes a sensor for continuously sensing the position of the arm. A signal generator generates a position signal which corresponds to the sensed position of the arm. The position signal has a value that varies with, and is representative of, the position of the arm.

The actuator actuates upon a start signal and moves the arm from its initial stroke position for the selected tool. A control circuit responds to the position signal and generates at least one control signal for controlling the operation of the actuator in response to the position signal being representative of one selected stroke position (e.g., the final stroke position). Preferably, the control circuit also generates another control signal for controlling the operation of the actuator in response to the position signal being representative of another selected stroke position (e.g., the initial stroke position).

In a preferred embodiment, the machine includes a pivotally mounted arm, and the machine includes a shaft which is rotated by the actuator and includes a linkage connected between the shaft and the arm to pivot the arm. The sensor is incorporated in a pulse generator rotary encoder which is operatively connected to the shaft. The position signal generator includes a circuit which is associated with the encoder to produce a position signal in the form of a cumulative pulse signal which is representative of the angular position of the shaft which in turn is representative of the arm position.

The control circuit in the preferred embodiment includes initial and final programmable registers which are associated with each tool. The initial register is settable at a selected value which corresponds to a cumulative pulse signal associated with the selected initial stroke position. Similarly, the final register is settable at a selected value which corresponds to a cumulative pulse signal associated with the selected final stroke position. This preferred embodiment includes means which are responsive to the cumulative pulse signal for generating a first control signal when the cumulative pulse signal equals the final register selected value. Similarly, the means are responsive to the cumulative pulse signal for generating a second control signal when the cumulative pulse signal equals the initial register selected value.

In this preferred embodiment, the first control signal reverses the direction of the operation of the actuator to move the arm to carry the selected tool back toward the initial stroke position. The second control signal terminates the operation of the actuator with the selected tool at the initial stroke position.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same.

FIG. 1 is a simplified, side elevational view of an exemplary, multi-station, metal working machine illustrating a system of the present invention, and the machine is shown with most of the near side wall of the housing cut away to better illustrate interior details;

FIG. 2 is a greatly enlarged, partial cross-sectional view taken generally along the plane 2—2 in FIG. 1 and also includes a simplified schematic diagram of part of the control circuit;

DESCRIPTION OF THE PREFERRED EMBODIMENTS

Figure 3:
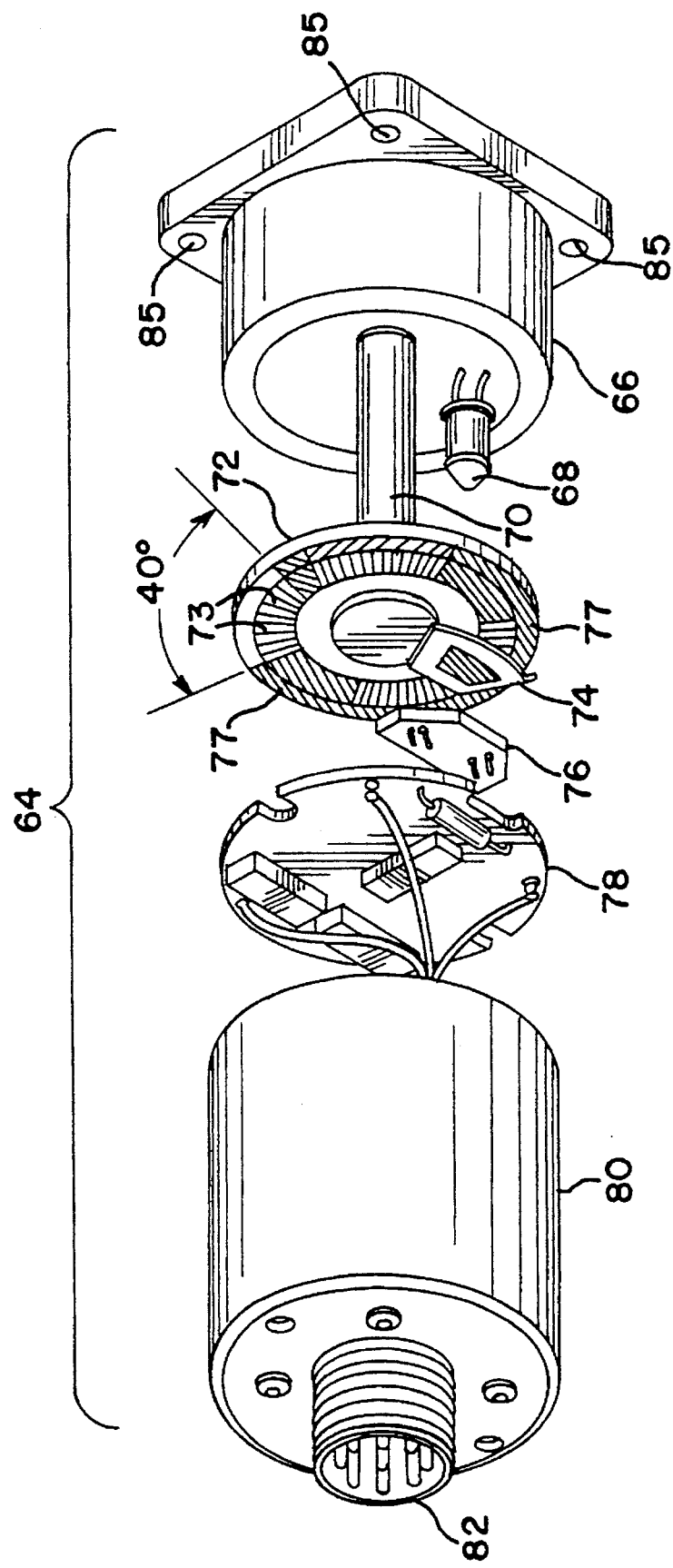
FIG. 3 is an exploded view of an exemplary pulse generator rotary encoder.

While this invention is susceptible of embodiment in many different forms, this specification and the accompanying drawings disclose only some specific forms as examples of the invention. The invention is not intended to be limited to the embodiments so described, however. The scope of the invention is pointed out in the appended claims.

For ease of description, the apparatus of this invention is described in the normal (upright) operating position, and terms such as upper, lower, horizontal, etc., are used with reference to this position. It will be understood, however, that the apparatus of this invention may be manufactured, stored, transported, used, and sold in an orientation other than the position described.

Figures illustrating the apparatus show some electrical and mechanical elements that are known and that will be recognized by one skilled in the art. The detailed descriptions of such elements are not necessary to an understanding of the invention, and accordingly, are herein presented only to the degree necessary to facilitate an understanding of the novel features of the present invention.

An exemplary iron worker machine tool having a system to control the stroke positions of tools thereon is illustrated in FIG. 1 and is designated generally therein by the reference number 10. One such suitable machine 10 on which the system may be employed is disclosed in the commonly assigned U.S. patent application Ser. No. 08/073,123 filed Jun. 7, 1993, now U.S. Pat. No. 5,394,732. A detailed description of portions of the machine 10 is provided in that U.S.A. patent application. However, various detailed design features form no part of the present invention and are described herein only to the extent necessary for an understanding of the present invention.

The machine 10 has a frame 12 and a main pivoting beam or first arm 14 mounted to the frame 12 with a central bearing assembly 16 for pivoting about a first axis 18. The bearing assembly 16 may be of any conventional or special design.

With particular reference to FIG. 1, the left-hand end 20 of the arm 14, together with the frame 12, defines a punching station 22. The punching station 22 contains a conventional punch holder 24 and punch 26 which are carried on the arm 14. Stationary die components 28 are mounted in the frame 12 below the arm left-hand end 20, and an adjustable height stripper 30 is also provided.

The right-hand end 32 of arm 14, together with the frame 12, defines a notching station 34 containing a conventional upper blade 36 and lower blade 38.

The central portion 40 of arm 14, together with the frame 12, defines a shearing station 42 which contains, as illustrated in FIG. 1, an adjustable shearing blade assembly comprising a stationary blade assembly 46 and a movable blade assembly 48 which is mounted to a second arm 50 that is pivotably mounted on the first arm 14. In other, more simple designs (not illustrated), the second arm 50 could be eliminated, and the shear blade 48 could be mounted directly to the first arm 14.

The punching station 22, notching station 34, and shearing station 42 are selectively operated by pivoting the main arm 14 as necessary to move the tools carried thereon into and out of the workpiece in a well-known manner. The pivoting motion of the arm 14 is represented by the double-headed arrow 51 in FIG. 1.

The system for pivoting the arm 14 includes a pair of parallel links 52 (only the near one is visible) which are pivotally connected with a pin 54 to the right-hand end 32 of arm 14, just inwardly of notching station 34. The lower end of each link 52 is pivotally connected with a second pin 56 to a crank arm 58 which is pivotally mounted to the frame 12 with a shaft 60 (FIG. 2). The frame 12 includes two side plates 59, and the shaft 60 is mounted for rotation in bearings 57 carried by the side plates 59.

The lower end of crank arm 58 is pivotally connected to an actuator 62, such as a conventional double acting hydraulic piston-cylinder actuator, for pivoting the crank arm 58 about the shaft 60 in a selected direction of rotation as indicated by the double-headed arrow 61 shown in FIG. 1. Shaft 60 rotates with movement of crank arm 58 relative to frame 12. Specifically, crank arm 58 pivots with shaft 60 which is pinned thereto by a pin 63 such that shaft 60 and crank arm 58 are fixed relative to each other.

Thus, depending upon whether the cylinder-piston actuator 62 is retracted or extended, the first arm 14 pivots counterclockwise or clockwise, respectively (as viewed in FIG. 1), in the central bearing 16 to effect the punching process at the punching station 22, the notching process at the notching station 34, or the shearing process at the shearing station 42. The use of a double acting piston-cylinder actuator to pivot a main arm 14 for operating a punching station, a notching station, or a shearing station is well-known in the art.

In a preferred embodiment, as illustrated in FIGS. 1 and 2, a pulse generator rotary encoder 64 is mounted to one of the side plates 59. The encoder 64 used in this application can be a standard, commercially available, single channel, pulse output type. However, the once-per-revolution, home position marker is preferably modified in this embodiment in accordance with the present invention as described in detail hereinafter. With the exception of the modified home position marker, the detailed design and operation of such an encoder 64 will be understood by those skilled in the art and form no part of the present invention. In the disclosed embodiment, the encoder 64 is a model HD20 SM-600-24LD-SCB-1-S10253-600, manufactured by Lucas Control Systems Products which has an office in Bloomingdale, Ill., U.S.A.

With particular reference to FIG. 3, the encoder 64 comprises a bearing housing assembly 66, a light-emitting diode ("LED") light source 68, input shaft 70, transparent code disk 72 with evenly spaced opaque lines 73, a stationary mask 74, photocell detector assembly (i.e., photodetector) 76, electronics board 78, cover 80, and electrical connector 82. In the illustrated encoder 64, the code disk 72 is mounted to the encoder input shaft 70 while the light source 68, mask 74, and photocell detector assembly 76 are stationary in the cover 80.

As the encoder input shaft 70 and code disk 72 rotate, the light received by the photocell detector assembly 76 is interrupted by the opaque lines 73. A signal is generated each time the light is received by the photocell detector assembly 76. The signal generated by the photocell detector assembly 76 may be produced in the form of a quasi-sine wave output which is converted in the encoder to a square wave form for transmission to a counter.

A single control mark 77 is also provided on the periphery of the code disk 72 to mark a reference position as sensed by the photocell detector assembly 76. This produces a marker pulse output in a separate channel which switches between on and off only once per input shaft revolution according to conventional techniques. The marker pulse is used to recalibrate the control system and reset counters in the control system as described in detail hereinafter.

Although the control mark on an encoder typically has a relatively short arc length, the inventor of the present invention has discovered that a short mark does not work well in some situations with the ironworker type machine. According to a preferred form of the present invention as incorporated in such a machine, a novel, longer arc control mark 77 has been developed. The arc length of the control mark may be, for example, sufficient to produce a marker pulse corresponding to between about 20 degrees and about 60 degrees of encoder rotation. In one contemplated embodiment, the control mark 77 has a width of about 320 degrees to produce a marker pulse of about 40 degrees. At each end of the 40 degree marker pulse signal a change of state occurs (i.e., off to on or on to off), and this is recognized by the control system.

As best seen in FIGS. 1 and 2, encoder 64 is mounted to one of the side plates 59 with bolts 84 inserted through mounting holes 85 (FIG. 3) in the bearing housing 66, or by other suitable means. The encoder input shaft 70 is operably connected to the machine shaft 60 by a coupling 86 or other means to assure that input shaft 70 and shaft 60 can rotate together as a unit.

The encoder 64 is electronically connected to a programmable logic controller (PLC) 88 (FIG. 2). The programming and capabilities of PLCs are not described in detail herein but are well-known to those skilled in the art. The PLC 88 is operably connected to the control system, and is to be provided with input electrical signals from the encoder 64.

A tool selector switch or mode switch 90 is provided for selecting the station (notching 34, shearing 42, or punching 22) to be operated through the PLC 88.

A main power switch 87 is included in the control circuit. When the power is switched on, the operator must first control the actuator 62 to perform a reference sequence operation of the machine (as described in detail hereinafter). This initially locates the hydraulic piston of the actuator 62 so that the encoder shaft 70 corresponds with either end of the 40 degree marker pulse of the encoder 64. The 40 degree marker pulse signal of the encoder 64 terminates at each end of the 40 degree arc at positions that correspond to positions of the arm 14 near either end of the travel of the actuator 62 and main pivot arm 14. Thus, the marker pulse corresponds to a major portion of the travel or stroke of the arm 14.

The termination of the marker pulse at each end of the pulse is a change of state that resets a pulse signal counter in the PLC 88 and recalibrates the PLC 88 each time the marker pulse terminates. This permits control of the machine even for relatively thin workpieces with an encoder that might "miss" a pulse or two in operation. The ends of the 40 degree marker pulse would correspond to positions of the arm 14 beyond the narrow central region containing the thin workpiece.

Movement of the actuator 62 away from the 40 degree marker pulse end point position generates pulse signals in the encoder normal channel. The PLC 88 counts the pulses as representative of the arm position away from the position corresponding to the marker pulse end point position of the actuator 62.

The PLC 88 has arithmetic register 91, 92, 93, 94, 95 and 96. These can each be programmed or set to store the value of the encoder position signal corresponding to selected stroke positions such as the initial, or top of stroke, position, and the final, or bottom of stroke, position. Additional registers can be employed if desired (e.g., to temporarily save tool positions unique to a particular workpiece thickness at a selected station).

In a preferred system arrangement, registers 91 and 92 can be set to the initial and final stroke positions, respectively, of the notcher upper blade 36. Registers 93 and 94 can be set to the initial and final stroke positions, respectively, of the movable shear blade assembly 48. Registers 95 and 96 can be set to the initial and final stroke positions, respectively, of the punch 26. For example, if the notcher top of stroke position corresponds to a 100 pulse signal from the encoder marker pulse, then the value of 100 can be set in the notcher initial register 91. An analogous procedure can be used to set the bottom of stroke position in the notcher register 92.

The control system also preferably includes an up and down jog switch 102 and companion emergency stop switch 104 near the notching station 34 and shearing station 42. Another up and down jog switch 106 and companion emergency stop switch 108 are located near the punching station 22.

The jog switches 102 and 106 operate appropriate, electrically actuated valves (not illustrated) in the hydraulic actuator system to pressurize the hydraulic actuator 62 in a selected direction. The control system prevents automatic cycling of the machine until the arm 14 is located near one of its two end of travel positions corresponding to one end or the other of the 40 degree marker pulse signal. This is accomplished by operating the machine through an initial reference sequence.

To this end, when the main power switch 87 is turned on, the operator must first simultaneously press the up and down buttons on either one of the jog switches 102 or 106. This causes the control system to operate the actuator 62 until the encoder 64 rotates to either end of the reference mark at which time the 40 degree marker pulse signal changes state. At that point the arm 14 is near one end or the other of its travel. The control system terminates the operation of the actuator 62 when the marker pulse signal changes state so as to initially maintain the arm 14 at one of the two corresponding positions near either end of its travel. This must be done each time the power switch 87 is turned on to enable subsequent automatic cycling of the machine. However, once the reference sequence has been performed, it does not have to be repeated unless the main power switch 87 is turned off. Thus, the mode switch 90 may be changed and other operations performed (as explained in detail hereinafter) without repeating the reference sequence for each mode.

Thereafter, the individual operation of each jog switch 102 or 106 positions the arm to a desired initial stroke position for a selected tool. In particular, jogging the switch 102 up or down retracts or extends, respectively, the actuator 62 to raise or lower, respectively, the end of the arm 14 at the notching station 34 and shearing station 42.

Jogging the switch 106 up or down extends or retracts, respectively, the actuator 62 to raise or lower, respectively, the end of the arm 14 at the punching station 22.

Upon termination of the actuation of a jog switch 102 or 106, the value of the initial (top of stroke) register for the selected tool (e.g., the notching station top of stroke register 91) is automatically set by the control system to the value of the encoder position signal.

The control system also includes a foot switch 120 which, upon actuation, operates appropriate, electrically actuated valves (not illustrated) in the hydraulic actuator system, as selected by the mode switch 90, to pressurize the hydraulic actuator 62 in a selected direction. Other inputs may be employed to facilitate additional desired features of the system operation and control.

In operation, the incremental rotational movement of the connected shafts 60 and 70 is, in essence, "counted" by the encoder 64 which generates a pulse each time the opaque lines 73 of the encoder disk 72 interrupt the light beam directed from the light source 68 to the photocell detector assembly 76. The pulses may be in the form of a quasi-sine wave output converted by the encoder to a square wave form. The square wave form pulses are transmitted to the PLC 88 and counted. The PLC 88 processes the cumulative pulse signal as being representative of the position of the main arm 14 at any given time. Additionally, the pulse signals produced by the encoder 64 are dependent upon the direction of rotation, such that the pulse signals to the PLC 88 do not accumulate in an absolute sense, but are added to or subtracted from, the total dependent upon the direction of rotation of the input shaft 70.

The set-up and operation of the apparatus of the present invention will be described for four different operations of the machine. The machine is capable of operating in the following different modes: notching, shearing, spot mode punching, and auto mode punching. Set-up and operation of the machine will be described for the notching, shearing, spot mode punching, and auto mode punching operations. It should be noted that set-up and operation in the notching and shearing modes is essentially identical with respect to the control system and process except that the tool selector switch 90 is set to the appropriate operation.

Notching Operation

The notching operation is used for notching all shapes of steel stock. First, the machine 10 is turned on with the main power switch 87. The machine must be initially operated through a reference sequence. To this end, the operator drives the arm 14 to a position near either end of its travel by simultaneously pressing the up and down buttons of the jog switch 102 (or, alternatively, jog switch 106). This, as explained above, operates the actuator 62 until the encoder forty degree marker pulse signal changes state (which corresponds to a position of the actuator 62 holding the arm 14 near one end or the other of the arm travel). The control system is programmed to prevent subsequent automatic cycling of the machine unless this is done each time the main power switch 87 is turned on.

The tool selector or mode switch 90 is then set to the "NOTCH" position. The workpiece to be notched is positioned in the notcher station 34 near the blade components 36. Then, the up/down jog switch 102 is operated as necessary to extend or retract the actuator 62 for positioning the upper notching blade component 36 just above the workpiece to provide sufficient clearance to move the workpiece into the proper position directly below the notcher blade 36. The efficiency of the process, especially where multiple, identical workpieces are to be notched is maximized by setting this "top of stroke" position as low as possible. The PLC 88 saves this position in the initial register 91 as the "top of stroke" position. This position is saved because the control system saves the last encoder pulse signal count in register 91 whenever the switch 102 is released while the mode switch 90 is set to "NOTCH". After the top of stroke position is set, the workpiece is moved to the proper location under the notcher blade 36.

The foot switch 120 is then depressed which actuates the actuator 62 at high speed and high pressure. The actuator 62 cycles the upper notch blade 36 toward the bottom of stroke position. The encoder pulse signal corresponding to the bottom of stroke position can be previously set (stored) in the final register 92 (by the manufacturer of the machine 10 or by the operator using the jog switch 102). Thus, when the blade 36 reaches the bottom of stroke position, the encoder pulse signal equals the stored value in the final register 92. At this position, the PLC 88 generates a first control signal which reverses the direction of the actuator 62, and the upper notcher blade 36 is raised back toward the initial top of stroke position.

When the upper notcher blade 36 reaches the initial, top of stroke position, the encoder pulse signal equals the stored value in the initial register 91. At that point, the PLC 88 generates a second control signal which stops the actuator 62 to maintain the upper notcher blade 36 at the initial (top of stroke) stroke position.

For purposes of safe operation, the control circuit requires the foot switch 120 to be depressed at least until the bottom of stroke position is reached. Upon release of the foot switch 120 after the bottom of stroke position, the actuator 62 continues operation until the top of stroke position is reached. If the foot switch 120 is released before the bottom of stroke position is reached, then the actuator 62 is reversed by the PLC 88 immediately, and the blade 36 is returned to the top of stroke position.

After the top of stroke position is reached, the actuator 62 is stopped by the PLC 88 to hold the notcher blade 36 at the top of stroke position. The next workpiece can be notched merely by positioning the next workpiece in the notching station 34 and again depressing the foot switch 120. This second depression of the foot switch 120 cycles the upper notch blade 36 to the bottom of stroke position through the workpiece and back to the initial stroke position previously set.

To reset the initial, or top of stroke, position, the jog switch 102 is used to reset the initial register 91. Additionally, the bottom of stroke position can be changed and set in the final register 92 by the operator through use of the jog switch 102. As such, the control system of the present invention provides maximum operating flexibility combined with all necessary and prudent safety features.

Shearing Operation

The shearing operation is analogous in function and operation to the notching operation described above herein. If the main power switch 87 has not been turned off following a prior operation, the machine need not be run through the reference sequence (as explained above for the "Notching Operation"). On the other hand, if the machine main power switch 87 is first turned on for this shearing operation, then the reference sequence must be run. That is accomplished by first simultaneously pressing the up and down buttons of the jog switch 102 (or, alternatively jog switch 106). This moves the arm 14 to a position near one of its two ends of travel as explained above with respect to the "Notching Operation."

To commence shearing operation, the mode switch 90 is set to "SHEAR". The initial register 93 for the shearing operation, which represents the top of stroke position, is then set as previously described for the notching operation using jog switch 104. Similarly, the final register 94, which represents the bottom of stroke position, may be set by the machine manufacturer or by the operator. All other features and operations of the shearing operation are analogous to the notching operation.

Spot Mode Punching Operation

The spot mode punching operation is effectively used when punching a workpiece wherein the workpiece is positioned with the use of a template or with layout marks on the workpiece itself. The spot punching operation is next briefly provided with reference to FIGS. 4-6. The stripper 30 is adjustable relative to the punch holder 24 and punch 26. The stripper 30 can be adjusted to vary the length of the punch 26 that projects beyond the stripper 30 in the initial, unactuated condition.

Figure 4A:
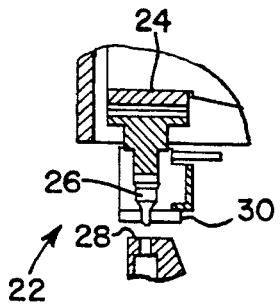
FIGS. 4A, 5A, and 6A are fragmentary, enlarged views of the punch components shown in FIGS. 4, 5, and 6, respectively.
Figure 4:
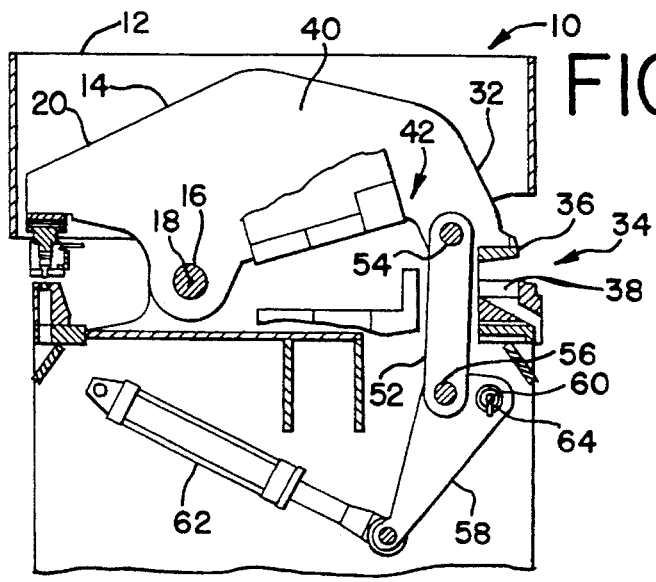
FIGS. 4 through 6 are views each similar to FIG. 1 and illustrate the sequence of the operation of the multi-station metal working machine in punch mode.

In the set-up position which is illustrated in FIG. 4, the punch 26 is shown extending a pre-selected small distance beyond the stripper 30.

Figure 5A:
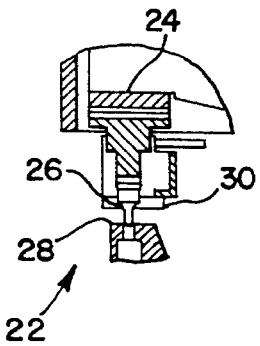
Figure 5:
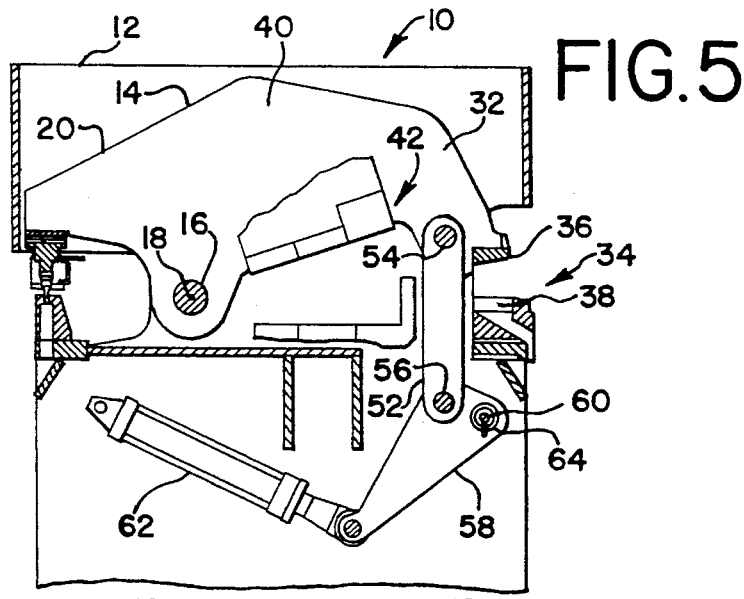

In the extended or punching position which is illustrated in FIG. 5, the arm 14 has lowered the punch 26 to the fully extended, or bottom of stroke position, beyond the stripper 30 for maximum penetration of punch 26 into the workpiece (not illustrated).

Figure 6A:
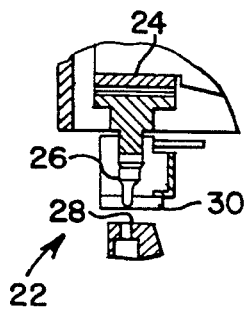
Figure 6:
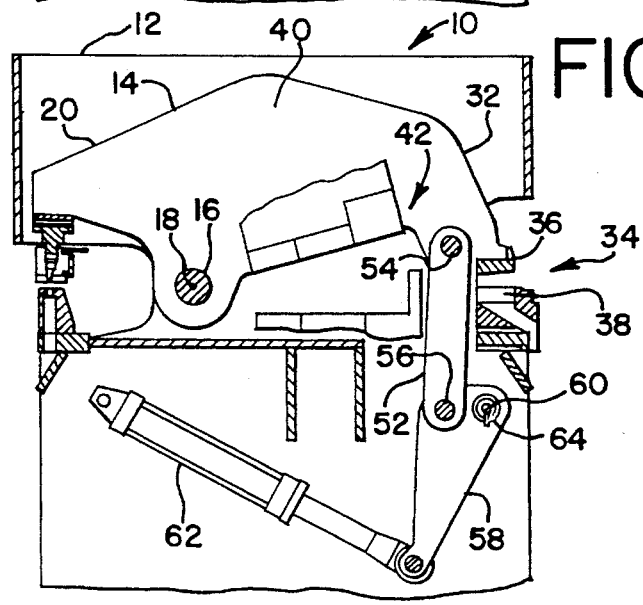

In the stripping position which is illustrated in FIG. 6, the punch 26 has been temporarily elevated above the bottom of the stripper 30. That is, the punch 26 retracts within the stripper 30. The retracted or stripping position is necessary because the punch may bind within the workpiece, and the stripper is engaged by the workpiece as the punch is withdrawn therefrom.

If the main power switch 87 had been turned off, then the machine must be initially run through the reference sequence operation as explained above in detail relative to the "Notching Operation." If the main power switch 87 had not been turned off following a prior operation, then the reference sequence need not be repeated.

When the reference sequence has been established, the tool selector mode switch 90 is set to the "SPOT PUNCH" position. Preferably, a notcher guard (not shown) is located on the notching station 34 and electrically interlocked with the control system such that the notcher guard (not shown) must be closed in order for the machine to operate in the punch mode. The workpiece is then temporarily positioned with an end near, but not under, the punch 26.

With the selector mode switch 90 in the "SPOT PUNCH" mode, the jog switch 106 is used to operate the actuator 62 to adjust the punch position to just above the workpiece. The PLC 88 stores this position in the punch initial register 95 as the top of stroke position in generally the same manner as described above with respect to the notcher and its initial register 91.

The workpiece is then moved fully under the punch in the punching station. The stripper 30 is then set to a position just above the workpiece with the punch 26 extending slightly therethrough. The workpiece can then be positioned for punching using a template or layout marks. The foot switch 120 can be "tapped" to move the punch 26 down onto the layout mark or template.

If the workpiece is positioned to the satisfaction of the operator, the foot switch 120 is then depressed and held down. This actuates the actuator 62 to cycle the arm 14 and move the punch 26 through the workpiece to the bottom of stroke position. In a manner analogous to the above-described notching operation, the bottom of stroke position corresponds to a previously set value in the final register 96. The final register position, or bottom of stroke position, can be preset by the machine manufacturer or can be set by the operator as described above with respect to the notching operation.

When the signal from the encoder 64 matches the final register value, PLC 88 generates a control signal which reverses the direction of travel of actuator 62, and the punch 26 is raised back toward the top of stroke position. However, the punch 26 continues to retract beyond the top of stroke position, as illustrated in FIG. 6, to strip the workpiece from the punch 26. In a preferred operational sequence, the punch retracts about 0.25 inches beyond the top of stroke position. This momentary, additional retraction of the punch 26 can be effected by a previously programmed sequence in the PLC 88. When the encoder signal first equals the value in the initial register 95, the PLC 88 continues operation of the actuator 62 for a predetermined additional encoder signal value equivalent to about 0.25 inches of travel. Then the PLC reverses the actuator 62 until the encoder signal value equals the initial register value, thus lowering the punch 26 to the top of stroke position, and the PLC 88 then terminates the operation of the actuator 64. The system is then ready for the next punching operation.

Again, the initial register position or top of stroke position can be reset using the jog switch controls.

Auto Mode Punching Operation

The auto mode punching operation is used when a workpiece is positioned on a table using stops (not shown) or other means. As with spot mode punching, the punch 26 extends beyond the stripper 30 during punching and retracts within the stripper 30 subsequent thereto to ensure the removal or stripping of the workpiece from the punch.

The machine operates in this mode with the punch 26 initially positioned above the stripper 30. Generally, the punch 26 is cycled fully to punch the workpiece and return above the stripper (to strip the workpiece) where it remains until the next punch cycle.

If the main power switch 87 had been turned off, then the machine must be initially run through the reference sequence operation as explained above in detail relative to the "Notching Operation." If the main power switch 87 had not been turned off following a prior operation, then the reference sequence need not be repeated.

When the reference sequence has been established, the tool selector mode switch 90 is set to "AUTO-PUNCH," and the notcher guard must be in place (closed). Then the workpiece is positioned in the punching station 22, and the stripper 30 is adjusted to the lowest possible position.

Then the jog switch 106 is operated to position the punch 26 to an elevation just above the stripper 30 (e.g., about 0.25 inch above the stripper 30). This is a top of stroke position, and the encoder signal value for this top of stroke position is automatically stored in the initial register 95 in the PLC 88 upon release of the jog switch 106. The workpiece position can then be further adjusted with the table stops or by hand.

The foot switch 120 is then depressed and held down. This operates the actuator 62 to cycle the punch 26 through the workpiece to the bottom of stroke position. Failure to hold the foot switch 120 down until the bottom of stroke is reached will cause the punch to return to the top of stroke position.

When the bottom of stroke position is reached, the signal from the encoder 64 equals a preset, stored value in the final register 96. In response to this condition, the PLC 88 generates a control signal which reverses the direction of travel of the actuator 62 and the punch 26. (The foot switch 120 can then be released, if desired.) Upon reaching the top of stroke position, the punch is free of the workpiece which as has been stripped by the stripper 30. The signal from the encoder 64 matches the stored value in the initial register 95 when the punch is at the top of stroke position. At that point, the PLC 88 generates a second signal which stops the actuator 62. The punch 26 then remains at this initial, or top of stroke, position above the stripper.

As with the other modes of operation, the top of stroke position can be reset in the register 95 at any time using the jog switches; and, the bottom of stroke position may be preset by the machine manufacturer or may be set by the operator.

Although the embodiment shown and described herein discloses the use of a pulse generator rotary encoder 64 to sense the position of the pivoting beam arm 14, it will be readily appreciated by those skilled in the art that alternative embodiments of the present invention could employ other digital encoders or even analog sensing devices, such as potentiometers, to sense the arm position and generate position signals corresponding to the sensed arm position.

As will be readily understood by those skilled in the art, the novel concepts of the present invention provide numerous advantages over the prior art machine tool stroke control systems presently in use in the industry. One such advantage is that the present system does not utilize limit switches to sense the arm position or to control arm operation. Thus, because no limit switches are used, the maintenance and adjustment of such switches is eliminated. This represents a significant time savings in the manufacture and maintenance of the machine.

Moreover, unlike the prior art control systems which employ limit switches and sense arm position only at specific locations according to the installed positions of such limit switches, the present invention can provide continuous sensing of the arm positions over the entire range of travel.

Furthermore, the flexibility of the preferred PLC programming and control can increase the efficiency and overall operation of the machine.

It will be readily apparent from the foregoing detailed description of the invention and from the illustrations thereof that numerous variations and modifications may be effected without departing from the true spirit and scope of the novel concepts or principles of this invention.

What is claimed is:

1. A process for controlling the stroke positions of tools on a multi-station metal working machine wherein the tools are carried on an arm which is operatively connected to an actuator for moving said arm with said tools carried thereon relative to a workpiece, each of said tools having a station associated therewith, the steps comprising:

providing a control circuit including a tool selector mode switch for selecting control of said actuator relative to a selected one of said tools, said control circuit further including at least one jog switch for operating said actuator to move said arm in a selected one of two opposite stroke directions, said control circuit further including initial and final programmable registers associated with said selected one of said tools, said initial registers each being settable at a selected value corresponding to a value of a position signal being representative of an initial stroke position of said arm, said final registers each being preset at a selected value corresponding to a value of said position signal being representative of a predetermined final position of said arm;

operating said tool selector mode switch to select control of said actuator relative to said selected one of said tools;

positioning said workpiece in said station of said selected one of said tools;

operating said jog switch in a selected stroke direction to position said selected one of said tools at a selected elevation above said workpiece corresponding to said initial stroke position and then terminating the operation of said jog switch;

continuously sensing the position of said arm; generating said position signal corresponding to the sensed position of said arm, said position signal having a value that varies with and is representative of the position of said arm;

in response to the termination of said jog switch, setting said initial register by storing in said initial register the value of said position signal corresponding to said initial stroke position;

said final register having been preset by storing in said final register the value of said position signal corresponding to a predetermined final stroke position;

operating said actuator in response to a start signal for moving said arm from said initial stroke position to said final stroke position;

generating a first control signal for reversing the direction of operation of said actuator in response to the value of said position signal being equal to said value stored in said final register;

operating said actuator in the reverse direction in response to said first control signal for moving said arm from said final stroke position to said initial stroke position; and generating a second control signal for terminating the operation of said actuator in response to the value of said position signal being equal to said value stored in said initial register.

2. A process for controlling the stroke positions of tools on a multi-station metal working machine wherein the tools are carried on an arm which is operatively connected to an actuator for moving said arm with said tools carried thereon relative to a workpiece, one of said tools being a punch having a punch tool located at a punching station with a stripper, the steps comprising:

providing a control circuit including a tool selector mode switch for selecting control of said actuator relative to a selected one of said tools, said control circuit further including at least one jog switch for operating said actuator to move said arm in a selected one of two opposite stroke directions, said control circuit further including initial and final programmable registers associated with said punch, said initial registers each being settable at a selected value corresponding to the a of a position signal being representative of an initial stroke position of said arm, said final registers each being preset at a selected value corresponding to a value of a position signal being representative of a predetermined final position of said arm;

operating said tool selector mode switch to select control of said actuator relative to said punch;

positioning said workpiece to be punched in said punch station;

operating said jog switch in a selected stroke direction to position said punch tool at a selected elevation above said workpiece corresponding to said initial stroke position and then terminating the operation of said jog switch;

continuously sensing the position of said arm;

generating said position signal corresponding to the sensed position of said arm, said position signal having a value that varies with and is representative of the position of said arm;

setting said initial register in response to the termination of said jog switch operation by storing in said initial register the value of said position signal corresponding to said initial stroke position;

said final register having been set by storing in said final register the value of said position signal corresponding to said predetermined final stroke position;

operating said actuator in a first direction in response to a start signal for moving said arm from said initial stroke position to said final stroke position;

generating a first control signal in response to the value of said position signal being equal to said final register stored value;

reversing the direction of operation of said actuator in response to said first control signal for moving said arm from said final stroke position to a preselected third position beyond said initial stroke position;

generating a second control signal in response to the value of said position signal being equal to the sum of said initial register stored value and a predetermined value, which sum corresponds to said preselected third position beyond said initial position;

reversing the direction of operation of said actuator in response to said second control signal for moving said arm from said preselected third position to said initial position;

generating a third control signal in response to the value of said position signal being equal to said initial register stored value; and terminating the operation of said actuator in response to said third control signal.

* * * * *